(12) United States Patent
Doran et al.

(10) Patent No.: US 6,650,452 B1
(45) Date of Patent: Nov. 18, 2003

(54) OPTICAL COMMUNICATIONS (75) Inventors: Nicholas John Doran, Coventry; Nicholas John Smith, Canterbury, both of (GB)

(73) Assignee: BTG International Limited, London (GB)

(*) Notice: Subject to any disclaimer, the term of this patent is extended or adjusted under 35 U.S.C. 154(b) by 0 days.

(21) Appl. No.: 09/653,540

(22) Filed: Aug. 31, 2000

Related U.S. Application Data (63) Continuation of application No. 09/083,966, filed on May 26, 1998, now abandoned, which is a continuation of application No. PCT/GB96/02923, filed on Nov. 27, 1996.

(30) Foreign Application Priority Data

Nov. 27, 1995 (GB) ............................................. 9524203

(51) Int. Cl.[7] ................................................ H04B 10/00
(52) U.S. Cl. ........................................ 359/161; 359/173
(58) Field of Search ................................ 359/173, 188, 359/161, 195

(56) References Cited

U.S. PATENT DOCUMENTS

| 4,778,237 A | | 10/1988 | Sorin et al. | ............... 350/96.15 |
| 5,343,322 A | * | 8/1994 | Pirio et al. | ................... 359/173 |
| 5,471,333 A | | 11/1995 | Taga et al. | ................... 319/173 |

(List continued on next page.)

FOREIGN PATENT DOCUMENTS

| EP | 0 609 129 A | 8/1994 | |
| EP | 0 777 347 A2 | 6/1997 | |
| EP | 0 777 347 A3 | 4/1998 | |
| EP | 0 846 977 A2 | 6/1998 | ............. G02F/1/35 |
| GB | 2 271 236 A | 4/1994 | |
| GB | 002277651 | 11/1994 | |
| GB | 2 279 838 | 1/1995 | |
| WO | WO 98/36512 | 8/1998 | ........... H04B/10/00 |

OTHER PUBLICATIONS

Electronics Letters, vol. 31, No. 3, Feb. 2, 1995, pp. 216/217 XP000504221 Nakazawa M et al: "Optical Soliton Communication in a Positively and Negatively Dispersion–Allocated Optical Fibre Transmission Line" see p. 216, right–hand column, last paragraph—p. 217, left–hand column, paragraph 3; figures 1,2.

Journal of Lightwave Techology, vol. 12, No. 8, Aug. 1, 1994, pp. 1330–1337, XP000484306 Forysiak W et al: "Stepwise Dispersion Profiling of Periodically Amplified Soliton Systems" see p. 1335, left–hand column, paragraph 2.

Patent Abstracts of Japan vol. 014, No. 301 (P–1069), Jun. 28, 1990 & JP 02 096120 A (Nippon Telegr & Teleph Corp), Apr. 6, 1990, see abstract.

M.N. Islam, et al., "Soliton Intensity–Dependent Polarization Rotation", *Optics Letters*, vol. 15, No. 1 (Jan. 1, 1990).

F.M. Knox, P. Harper, P.N. Kean, I. Bennion, and N.J. Doran, Inside Conference Item ID CN014437473: "1–Gbits/soliton transmission over standard fibre", *Colloquium Digest—IEE*, Issue 90 (1996), pp. 13/1–13/4.

(List continued on next page.)

*Primary Examiner*—Kinfe-Michael Negash
(74) *Attorney, Agent, or Firm*—Morgan, Lewis & Bockius LLP (57) ABSTRACT

A dispersion management system for soliton or soliton-like transmission systems comprises a length of optical fiber (L) in which a plurality of sections (l) made up of components (N,A) of opposite sign dispersions are concatenated together. The duration of the dispersion compensation phase is short in comparison with the propagation interval in the remainder of the system and that the path average dispersion is anomalous.

17 Claims, 4 Drawing Sheets

U.S. PATENT DOCUMENTS

| | | | | |
|---|---|---|---|---|
| 5,488,620 A | | 1/1996 | Minden | 372/18 |
| 5,508,845 A | | 4/1996 | Frisken | 359/161 |
| 5,513,194 A | | 4/1996 | Tamura et al. | 372/6 |
| 5,559,910 A | * | 9/1996 | Taga et al. | 359/179 |
| 5,574,590 A | | 11/1996 | Edagawa et al. | 359/179 |
| 5,577,057 A | | 11/1996 | Frisken | 37/18 |
| 5,612,808 A | * | 3/1997 | Audouin et al. | 359/161 |
| 5,629,795 A | | 5/1997 | Suzuki et al. | 359/337 |
| 5,680,491 A | * | 10/1997 | Shigematsu et al. | 359/161 |
| 5,764,841 A | | 6/1998 | Iwatsuki et al. | 385/123 |
| 5,798,853 A | | 8/1998 | Watanabe | 359/160 |
| 5,828,478 A | | 10/1998 | Thomine et al. | 359/181 |
| 5,887,105 A | * | 3/1999 | Bhagavatula et al. | 385/123 |
| 5,898,716 A | | 4/1999 | Ahn et al. | 372/6 |
| 5,905,825 A | | 5/1999 | Brindel et al. | 385/24 |
| 6,097,524 A | | 8/2000 | Doran et al. | 359/179 |
| 6,122,088 A | | 9/2000 | Hasegawa | 359/188 |
| 6,137,604 A | * | 10/2000 | Bergano | 359/161 |
| 6,243,181 B1 | | 6/2001 | Golovchenko et al. | 319/161 |
| 6,307,985 B1 | * | 10/2001 | Murakami et al. | 385/24 |
| 6,321,015 B1 | * | 11/2001 | Doran et al. | 385/123 |
| 6,473,550 B1 | * | 10/2002 | Onishi et al. | 385/123 |

OTHER PUBLICATIONS

A.M. Niculae, W. Forysiak, and N.J. Doran, INSPEC Abstract Number: A2000–06–4265S–019, B2000–03–4340S–030: "Optical Amplifier location in strong dispersion–managed soliton systems", Conference on Lasers and Electro–Optics CLEO '99 (IEEE Cat. No. 99CH37013) (1990), pp. 236–237.

S.B. Alleston, P. Harper, I.S. Penketh, I. Bennion, and N.J. Doran, INSPEC Abstract Number: A2000–02–4280S–032, B2000–01–6260F–038: "1220 km propagation of 40 Gbit/s single channel RZ data over dispersion managed standard (non–dispersion shifted) fibre", Cat. No. 99CH36322 (1999), Suppl. Publication, p. PD3/1–3.

S.B. Alleston, P. Harper, I.S. Penketh, I. Bennion, and N.J. Doran, INSPEC Abstract Number: B1999–03–6260M–005, "40 Gbit/s single channel dispersion managed pulse propagation in standard fibre over 509 km", Electronics Letters, vol. 35, No. 1 (Jan. 7, 1999), pp. 57–59.

S.B. Alleston, P. Harper, I.S. Penketh, I. Bennion, N.J. Doran, and A.D. Ellis, INSPEC Abstract Number: B1999–06–6260F–059: 40 Gbit/s soliton transmission over dispersion managed standard fibre links, IEEE Colloquium on High Speed and Long Distance Transmission (Ref. No. 1999/022) (1999), p. 2/1–4.

S.B. Alleston, P. Harper, I.S. Penketh, I. Bennion, N.J. Doran, and A.D. Ellis INSPEC Abstract Number: B1999–08–6260F–011: "1000 km transmission of 40 Gbit/s single channel RZ data over dispersion managed standard (non–dispersion shifted) fibre", Electronics Letters, vol. 35, No. 10 (May 13, 1999), pp. 823–824.

S.B. Alleston, P. Harper, I.S. Penketh, I. Bennion, and N.J. Doran, INSPEC Abstract Number: B1999–12–6260–005: "16000 KM 10 Gbits/$^{-1}$ soliton transmission over standard fibre by reduction of interactions through optimum amplifier positoning", Cat. No. 99CH36322, vol. 2 (1999), pp. WC4–1/41–WC4–3/43.

A. Bernstson, D. Anderson, N.J. Doran, W. Forysiak, and J.H.B. Nijhof, INSPEC Abstract Number: B9812–6260–227: "Power dependence and accessible bandwidth for dispersion–managed solitons in asymmetric dispersion maps", Electronics Letters, vol. 34, No. 21 (Oct. 15, 1998), pp. 2054–2056.

A. Bernston, N.J. Doran, W. Forysiak, and J.H.B. Nijhof, INSPEC Abstract Number: A9818–4265S–003, B9809–4340–086, "Power dependence of dispersion–managed solitons for anomalous, zero and normal path–average disperson", Optics Letters, vol. 23, No. 12 (Jun. 15, 1998), pp. 900–902.

K.J. Blow and N.J. Doran, Genuine Article No. EW885, "Solitons across The Atlantic", Physics World, vol. 4, No. 2 (Feb. 199), pp. 33–34.

K.J. Blow and N.J. Doran, INSPEC Abstract Number: A82102951, B82059670, "High bit rate communication systems using non–linear effects", Optics Communications, vol. 42, No. 6 (Aug. 15, 1982), pp. 403–406.

K.J. Blow and N.J. Doran, INSPEC Abstract Number: B83040547, "Bandwidth limites of nonlinear (soliton) optical communicaton systems", Electronics Letters, vol. 19, No. 11 (May 26, 1983), pp. 429–430.

K.J. Blow and N.J. Doran, INSPEC Abstract Number: A84044149: "Global and local chaos in the pumped nonliner Schrödinger equation", Physical Review Letters, vol. 52, No. 7, (Feb. 13, 1984), pp. 526–529.

K.J. Blow and N.J. Doran, INSPEC Abstract Number: A850409959: "Multiple dark soliton solutions of the non–linear Schrödinger equation", Physics Letters A, vol. 107A, No. 2 (Jan. 14, 1985), pp. 55–58.

K.J. Blow and N.J. Doran, INSPEC Abstract Number: A85053890, "The asymptotic disperson of soliton pulses in lossy fibres", Optics Communications, vol. 52, No. 5 (Jan. 1, 1985), pp. 367–370.

K.J. Blow and N.J. Doran: INSPEC Abstract Number: A87103907, B87054402, "Nonlinear effects in optical fibres and fibre devices", IEE Proceedings, vol. 134, Pt. J., No. 3 (Jun. 1987), pp. 138–144.

K.J. Blow and N.J. Doran, INSPEC Abstract Number: A91120943: "Average soliton dynamics and the operation of soliton systems with lumped amplifiers", IEEE Photonics Technology Letters, vol. 3, No. 4 (Apr. 1991), pp. 369–371.

K.J. Blow, N.J. Doran, and S.J.D. Phoenix, INSPEC Abstract Number: A9211–4265–001, "The soliton phase", Optics Communications, vol. 88, No. 2,3 (Mar. 15, 1992), pp. 137–140.

K.J. Blow, N.J. Doran, and D. Wood: INSPEC Abstract Number: A88043167, B88020371, "Trapping of energy into solitary waves in amplified nonlinear dispersive systems", Optics Letters, vol. 12, No. 12 (Dec. 1987), pp. 1011–1013.

K.J. Blow, N.J. Doran, and D. Wood: INSPEC Abstract Number: A88060956, B88033651: "Generation and stabilization of short soliton pulses in the amplified nonlinear Schrödinger equation", J. Opt. Soc. Am. B, vol. 5, No. 2 (Feb. 1988), pp. 381–391.

J.F. Devaney, W. Forysiak, and N.J. Doran, INSPEC Abstract Number: A9803–4265S–004, B9802–4340–021: "Soliton collisions in dispersion–managed WDM systems", ECOC 97, Conference Publication No. 448, IEE, vol. 3 (Sep. 22–25, 1997), pp. 223–236.

J.F. Devaney, W. Forysiak, and N.J. Doran, INSPEC Abstract Number: B1999–07–6260M–022: "Reduction of collision induced timing jitter in multichannel soliton systems by dispersion management", ECOC '98 (IEEE Cat. No. 98TH8398), vol. 1 (1998), pp. 89–90.

J.F. Devaney, W. Forysiak, A.M. Niculae, and N.J. Doran, INSPEC Abstract Number: A9803–4280S–015, B9802–6260–024: "Soliton collisions in dispersion–managed wavelength–division–multiplexed systems", *Optics Letters*, vol. 22, No. 22 (Nov. 15, 1997), pp. 1695–1697.

J.F. Devaney, W. Forysiak, N.J. Smith, and N.J. Doran, INSPEC Abstract Number: B9706–6260–081: "Modeling WDM soliton transmission in dispersion–managed systems", IEE Colloquium on WDM Technology and Applications (Ref. No. 1997/036), (1997), pp. 4/1–4/4.

J.F. Devaney, W. Forysiak, N.J. Smith, and N.J. Doran, INSPEC Abstract Number: B9808–6260–180: "WDM of enhanced power solitons in strongly dispersion–managed systems", *OFC '97 Technical Digest*, vol. 6 (IEEE Cat. No. 97CH36049), pp. 306–307.

N.J. Doran, E.I. No. EIP02016818279: "Soliton communications systems: The concept is alive", Conference Proceedings—Lasers and Electro–Optics Society Annual Meeting—LEOS, vol. 1, IEEE Cat. No. 01CH37242 (2001), pp. 214–215.

N.J. Doran, E.I. No.: EIP98044174957: "Dispersion–managed solitons: A new paradigm for high data rate", Conference on Optical Fiber Communication, *OFC '98 Technical Digest* (IEEE Cat. No. 98CH36177), p. 265.

N.J. Doran, Genuine Article No. HC722, "Solitons the key to global cheap–talk", *Physics World*, vol. 5, No. 2 (Feb. 1992), p. 25.

N.J. Doran, Inside Conference Item ID: CN008356099, "Nonlinear Phenomena in Optical Fibres", *NATO ASI Series E Applied Science*, vol. 289 (1995), pp. 75–102.

N.J. Doran, INSPEC Abstract Number: A1999–14–4280S–012, B1999–07–6260M–024: "Dispersion managed soliton systems", OCOC '98 (IEEE Cat. No. 98TH8398), vol. 1 (Sep. 20–24, 1998), pp. 97–99.

N.J. Doran: INSPEC Abstract Number: A86090313, B89048178: "Nonlinear pulse propagation in optical fibres", IOOC—ECOC '85, vol. 2 (1985), pp. 157–164.

N.J. Doran, INSPEC Abstract Number: A9421–4282–014, B9411–4125–034: "All–optical control and future opportunities for ultra high speed transmission on optical fibres", EPOC & n'94, pp. 5–7.

N.J. Doran and K.J. Blow, INSPEC Abstract Number: A84049551, B84025386: "Solitons in optical communications", *IEEE Journal of Quantum Electronics* vol. QE–19, No. 12 (Dec. 1983), pp. 1883–1888.

N.J. Doran and W. Forysiak, INSPEC Abstract Number: A9404–4265F–015, B9402–4340–092: "Optimizing the capacity of soliton systems", *IEE Colloquium on 'Ultra–Short Optical Pulses'*, Digest No. 1993/202 (1993), p. 10/1–2.

N.J. Doran and W. Forysiak, INSPEC Abstract Number: A9518–4265S–012, B9510–4340–083: "Phase conjugation for jitter and soliton– soliton compensation in soliton communications", CLEO '94, Summaries of Papers Presented at the Conference on Lasers and Electro–Optics, Technical Digest Series, Conference Edition (Cat. No. 94CH3463–7), vol. 8 (1994), pp. 367–368.

N.J. Doran, W. Forysiak, P. Harper, S.B. Alleston, S.K. Turitsyn, and D. Govan, INSPEC Abstract Number: A2000–02–4281–021, B2000–01–4125–102: "The dispersion management of solitons", The Australian Optical Society Conference (ACOFT/AOS'99), pp. 5–9.

N.J. Doran, W. Forysiak, F.M. Knox, N.J. Smith, and I. Bennion, INSPEC Abstract Number: A9610–4280S–003, B9605–6260–186: "Optimizing transmission capacity: long distance and terrestrial applications", *Phil. Trans. R. Soc. Lond. A*, vol. 354, no. 1708 (Mar. 15, 1996), pp. 679–694.

N.J. Doran, W. Forysiak, J.H. B. Nijhof, A.M. Niculae, and A. Berntson, Inside Conference Item ID: CN025778248: "Remarkable Features of DM Solitons: Implications for High Speed and WDM Systems", *New Trends in Optical Soliton Transmission Systems*, vol. 5 (Jan. 13, 1998), pp. 303–316.

N.J. Doran, W. Forysiak, J.H.B. Nijhof, and A. Niculae, 02503004 Inside Conference Item ID: CN026121447: "Remarkable properties of dispersion managed solitons", *OSA Technical Digest Series*, vol. 5(1998), p. WSB1.

N.J. Doran, W. Forysiak, N.J. Smith, and J.F.L. Devaney, E.I. No.: EIP97083773098: "Soliton dynamics in periodically varying dispersion system", QELS '97, Conference on Quantum Electronics and Laser Science, IEEE Cat. No. 97CB36111, vol. 12, pp. 55–56.

N.J. Doran, W. Forysiak, N.J. Smith, F.M. Knox, and K.M. Allen, INSPEC Abstract Number: A9518–4265S–003, B9510–6260–024, "Design of soliton systems for optimum capacity", *Pure Appl. Opt.*, vol. 4 (Jul. 1995), pp. 271–279.

N.J. Doran, N.J. Smith, W. Forysiak, and F.M. Knox, Inside Conference Item ID: CN015687880: "Dispersion As Control Parameter in Soliton Transmission Systems", *Physics and Applications of Optical Solitons in Fibres '95*, vol. 3 (1996), pp. 1–14.

N.J. Doran, N.J. Smith, W. Forysiak, and F.M. Knox, "Dispersion as Control Parameter in Soliton Transmission Systems", Physics and Applications of Optical Soliton in Fibres '95: Proceedings of the Symposium held in Kyoto, Japan (Nov. 14–17, 1995).

N. Edagawa, I. Morita, M. Suzuki, S. Yamamoto, H. Taga, and S. Akiba: "20 Gbit/s, 8100 km straight–line single–channel soliton–based RZ transmission experiment using periodic dispersion compensation", *Proc. 21st Euro. Conf. Opt. Commun.* (*ECO '95*—Brussels), pp. 983–986.

A. Ellis, et al., "5 Gbit/s soliton propagation over 350 km with large periodic dispersion coefficient perturbations using erbium doped fiber repeaters", *Electronics Letters*, vol. 27, No. 10 (May 9, 1991), pp. 878–880.

W. Forysiak and N.J. Doran, Inside Conference Item ID: CN000566111: Stepwise dispersion profiling of periodically amplified soliton systems, *Technical Digest Series*—Optical Society of America (OSA), vol. 15, (1993), pp. TuA4–1/170–TuA4–4/173.

W. Forysiak, K.J. Blow, and N.J. Doran, INSPEC Abstract Number: B9310–6260–036: "Reduction of Gordon–Haus jitter by post–transmission dispersion compensation", *Electronic Letters*, vol. 29, No. 13 (Jun. 24, 1993), pp. 1225–1226.

W. Forysiak, J.F. L. Devaney, N.J. Smith, and N.J. Doran, INSPEC Abstract Number: A9714–4281–008, B9707–6260–082: "Dispersion management for wavelength–division–multiplexed soliton transmission", *Optics Letters*, vol. 22, No. 9 (May 1, 1997), pp. 600–602.

W. Forysiak and N.J. Doran, INSPEC Abstract Number: A9514–4280S–015, B9508–6260–034: "Reduction of Gordon–Haus jitter in soliton transmission systems by optical phase conjugation", *Journal of Lightwave Technology*, vol. 13, No. 5 (May 1995), pp. 850–855.

W. Forysiak, N.J. Doran, F.M. Knox, and K.J. Blow, INSPEC Abstract Number: A9514–4265S–002, B9508–4340–012 "Average soliton dynamics in strongly perturbed systems" *Optics Communications*, vol. 117 (May 15, 1995), pp. 65–70.

W. Forysiak, F.M. Knox, and N.J. Doran, INSPEC Abstract Number: A9408–4281–011, B9404–4125–026: "Average soliton propagation in periodically amplified systems with stepwise dispersion–profiled fiber", *Optics Letters*, vol. 19, No. 3 (Feb. 1, 1994), pp. 174–176.

W. Forysiak, F.M. Knox, and N.J. Doran, INSPEC Abstract Number: A9422–4265–012, B9411–4340–074: "Stepwise dispersion profiling of periodically amplified soliton systems", *Journal of Lightwave Technology*, vol. 12, No. 8 (Aug. 1994), pp. 1330–1337).

W. Forysiak, J.H.B. Nijhof, and N.J. Doran, INSPEC Abstract Number: A2000–16–4281–008, B2000–08–4125–043: "Dispersion managed solitons: the key to terabit per second optical fiber communication systems", *Optics & Photonics News*, vol. 11, No. 5 (May 2000), pp. 35–39.

I.R. Gabitov and S.K. Turisyn, "Breathing Soliton in Cascaded Transmission System with Passive Dispersion Compensation", Physics and Applications of Optical Solitons in Fibres '95: Proceedings of the Symposium held in Kyoto, Japan (Nov. 14–17, 1995), pp. 365–373.

D.S. Govan, W. Forysiak, and N.J. Doran, Inside Conference Item ID: CN026120765: "40 Gbit/s soliton transmission over standard fiber with dispersion management", *OSA Technical Digest Series*, vol. 5 (1998), p. NWE10–1/89–NWE10–3/91.

D.S. Govan, W. Forysiak, and N.J. Doran, Inside Conference Item ID: CN030112236: "40 Gbit/s RZ transmission over more than 2000 km of standard fibre with dispersion management", Colloquium Digest—IEE (1999), Issue 22, pp. 3/1–3/6.

D.S. Govan, W. Forysiak, and N.J. Doran, INSPEC Abstract Number: A9901–4280S–011, B9901–6260C–006: "Long–distance 40–Gbit/s soliton transmission over standard fiber by use of dispersion management", *Optics Letters*, vol. 23, No. 19 (Oct. 1, 1998), pp. 1523–1525.

D.S. Govan, W. Forysiak, and N.J. Doran, INSPEC Abstract Number: B1999–07–6260–005: "40 Gbit/s RZ transmission over more than 2000 km of standard fibre with dispersion management", IEE Colloquium on High Speed and Long Distance Transmission (Ref. No. 1999/0022) (1999), pp. 3/1–6.

D.S. Govan, N.J. Smith, F.M. Knox, and N.J. Doran, INSPEC Abstract Number: A9802–4281–004, B9801–4125–040: "Stable propagation of solitons with increasted energy through the combined action of dispersion management and periodic saturable absorption", *J. Opt. Soc. Am. B.*, vol. 14, No. 11 (Nov. 1997), pp. 2960–2966.

D.S. Govan, S.K. Turitsyn, and N.J. Doran, INSPEC Abstract Number: B2001–02–6260F–054: "40–Gbit/s dispersion–managed soliton transmission over 3000 km of standard fiber through optimization of the dispersion map parameters", CLEO 2000 (Cat. No. 00CH37088), pp. 238–239.

A. Hasegawa (Ed.), "Physics and Applications of Optical Solitons in Fibres '95", Proceedings of the Symposium held in Kyoto, Japan, Solid–State Science and Technology Library (Nov. 14–17, 1995), Table of Contents.

P. Harper, S.B. Alleston, I. Bennion, and N.J. Doran, INSPEC Abstract Number: B2000–02–6260F–003: "40 Gbit/s dispersion managed soliton transmission over 1160 km in standard fibre with 75 km span length", *Electronics Letters*, vol. 35, No. 24 (Nov. 25, 1999), pp. 2128–2120.

P. Harper, S.B. Alleston, and N.J. Doran, Inside Conference Item ID: CN037961966: "80 Gbit/s RZ Transmission over 523 km Using Dispersion Compensated Standard Fibre", 26th European Conference on Optical Communication (2000), vol. 2, pp. 143–146 VDE.

P. Harper, S.B. Alleston, W. Forysiak, and N.J. Doran, INSPEC Abstract Number: B2001–02–6260C–035: "10 Gbit/s dispersion–managed soliton transmission over 13,400 km in a weak symmetric non–zero dispersion shifted fiber dispersion map", CLEO 2000, *TOPS*, vol. 39 (IEEE Cat. No. 00CH37088), pp. 237–238.

P. Harper, S.B. Alleston, D.S. Govan, W. Forysiak, I. Bennion, and N.J. Doran, Inside Conference Item ID: CN036435057: "40 Gbit/S Recirculating Loop Experiments on Dispersion Managed Standard Fibre", Solid State Science and Technology Library (2000), vol. 6, pp. 387–402.

P. Harper, S.B. Alleston, I.S. Penketh, D.S. Govan, I. Bennion, A.D. Ellis, and N.J. Doran, INSPEC Abstract Number: B2000–07–6260F–012: "40 Gbit/s nonlinear RZ pulse propagation over 900 km with a 75 km standard fibre span using dispersion compensation: optimization of the launch position", ECOC '99, vol. 1 (Sep. 26–30, 1999), pp. I–1999–I–233.

P. Harper, F.M. Knox, D.S. Govan, P.N. Kean, I. Bennion, and N.J. Doran, INSPEC Abstract Nomber: B9806–6260–126: "Long distance 10Gbit/s sliton transmission over standard fibre with periodic dispersion compensation", Core and ATM Networks, NOC (1977), pp. 18–24.

P. Harper, F.M. Knox, P.N. Kean, I. Bennion, and N.J. Doran, INSPEC Abstract Number: B9806–6260–126: "Long distance 10Gbit/s soliton propagation over 5250 km in standard fiber with dispersion compensation", *1997 OSA Technical Digest Series,* vol. 6 (1997) (IEEE Cat. No. 97CH36049), pp. 304–305.

P. Harper, F.M. Knox, P.N. Kean, L. Zhang, N.J. Doran, and I. Bennion, INSPEC Abstract Number: A9612–4265S–016, B9607–4340–039: "Soliton transmission over 2700 km using an in–fibre Bragg grating filter to give Gordon–Haus jitter reduction", *IEEE Colloquium on Optical Solitons: Princeiples and Applictions (Digest No. 1996/090)* (1996), p 8/1–4.

P. Harper, F.M. Knox, P.N. Kean, L. Zhang, N.J. Doran, and I. Bennion, E.I. No.: EIP96110399059: "Jitter suppression in a 2700 km soliton propagation experiment using only a fibre Bragg grating filter", Conference on Lasers and Electro–Optics Europe–Technical Digest, CThF3 (1996), p. 245.

P. Harper, I.S. Penketh, S.B. Alleston, I. Bennion, and N.J. Doran, INSPECT Abstract Number: B9812–6260–152: "10Gbit/s dispersion managed soliton propagation over 200 Mm without active control", *Electronics Letters,* vol. 34, No. 21 (Oct. 15, 1998), pp. 1997–1999.

P. Harper, I.S. Penketh, S.B. Alleston, and N.J. Doran, INSPEC Abstract Number: A1999–14–4280S–015, B19999–07–6260=011: "200 000 km 10 Gbit/s soliton propagation exploiting periodic saturable absorption", ECOC '98 (IEEE Cat. No. 98TH8398), vol. 1, (Sep. 20–24, 1998), pp. 107–108.

P. Harper, I.S. Penketh, S.B. Alleston, and N.J. Doran, INSPEC Abstract Number: A9820–5392–012, B9810–4125–043; "Dispersion–optimized soliton propagation over 24 000 km in standard fibre using dispersion compensation", Long–Haul, ATM and Multi–Media Networks NOC '98, pp. 244–252.

S.M.J. Kelly, K. Smith, K.J. Blow, and N.J. Doran, INSPEC Abstract Number: A91141490, B91077790: "Average soliton dynamics of a high–gain erbium fiber laser", *Optics Letters*, vol 16, No. 17 (Sep. 1, 1991), pp. 1337–1339.

F. M. Knox, W. Forysiak, and N.J. Doran, INSPEC Abstract Number: A9524–4265S–003, B9512–4340–074: "10–Gbit/s soliton communication systems over standard fiber at 1.55 μm and the use of dispersion compensation", *Journal of Lightwave Technology*, vol. 13, No. 10 (Oct. 1995), 1955–1995.

F.M. Kox, N.J. Doran, Genuine Article No. TA411, "10–Gbit/S Soliton Communication–Systems Over Standard Fiber At 1.55–μm and the Use of Dispersion Compensation", *Journal of Lightwave Technology*, vol. 13, No. 10 (Oct. 1995), pp. 1955–1962, Issn: 0733–8724.

F.M. Kox, W. Forysiak, and N.J. Doran, E.I. No. EP95012505817: "Upgrading standard fibre communication links to 10 Gbit/s using soliton and dispersion compensation", Conference on Lasers and Electro–Optics Europe – Technical digest (1994), *IEEE*, Piscataway, N.J., U.S.A., 94TH0617–8 (1994), pp. 279–280.

F.M. Kox, P. Harper, P.N. Kean, and I Bennion, and N.J. Doran, INSPEC Abstract Number: A9612–4265S–019. B9607–4340–042: "10 Gbit/s soliton transmission over standard fibre", *IEEE Colloquium on Optical Solitons: Principles and Applications (Digest No. 1996/090)* (1996), p. 13/1–4.

F.M. Kox, P. Harper, P.Kean, I Bennion, and N.J. Doran, INSPEC Abstract Number: A9720–4280S–005, B9710–6260–204: "Soliton transmission at 10 Gbit/s over 2022 km of standard fibre with dispersion compensation", 22nd European Conference on Optical Communication–ECOC '96, (IEEE Cat. No. 96TH8217, vol. 3, (1996), pp. Wec.3.2/3.104.

F.M. Kox, P. Harper, P.N. Kean, N.J. Doran, and I. Bennion, INSPEC Abstract Number: B9511–4125–030: "Low jitter long distance pulse transmission near net fibre dispersion zero wavelength", *Electronics Letters*. vol. 31, No. 17 (Aug. 17, 1995), pp. 1467–1468.

F.M. Kox, N.J. Smith, and N.J. Doran, "10 Gbit/s solution communication systems over standard fiber at 1.55 μm and the use of dispersion compensation", *J. Lightwarve Technology*, vol. 13 (1995), pp. 1955–1962.

H. Kubota and M. Nakazawa, "A Dispersion–Allocated Solition and Its Impact on Soliton Communication", Physics and Applications of Optical Solitons in Fibres '95: Proceedings of the Symposium held in Kyoto, Japan (Nov. 14–17, 1995), pp. 27–35.

H. Kubota and M. Nakazawa, "Partial soliton communication systems", *Optics Communications*, vol. 87 (Jan. 1, 1992), pp. 15–18.

V.K. Mezentsev, S.K. Turitsyn, and N.J. Doran, INSPEC Abstract Number: B2001–01–6260–002: "System Optimization of 80 Gbit/s single channel transmission over 1000 km of standard fibre", *Electronics Letters*, vol. 36, No. 23 (Nov. 9, 2000), pp. 1949–1951.

M. Nakazawa and H. Kubota, "Optical soliton communication in a positively and negatively dispersion allocated optical fibre transmission line", *Electronics Letters*, vo. 31, (Feb. 1995), pp. 216–217.

B.P. Nelson, D. Cotter, K.J. Blow, and N.J. Doran, INSPEC Abstract Number: A84024075: "Large nonlinear pulse boardening in long lengths of monomode fibre", *Optics Communications*, vol. 48, No. 4 (Dec. 15, 1983), pp.292–294.

B.P. Nelson, D. Cotter, K.J. Blow, and N.J. Doran, INSPEC Abstract Number: A83095161: "Large nonlinear pulse broadening in long lengths of monomode fibre", IEE (1983), pp. 7/1–7/3.

A.M. Niculae, W. Forysiak, and N.J. Doran, 02502966 Inside Conference Item ID: CN026121447: "Remarkable properties of dispersion managed solitons", *OSA Technical Digest Series* vol. 5 (1998). pp. NThD3–1/184–NTHD3–3/186.

A.M. Niculae, W. Forysiak, and N.J. Doran, INSPEC Abstract Number: A1999–10–4280S–033, B1999–05–6260M–072: "Optimal amplifier location in strong dispersion–managed soliton systems", IEE Colloquium Optical Solitons (Ref. No. 1999/016) (1999), p. 8/1–4.

A.M. Niculae, W. Forysiak, A.J. Gloag, T.H.B. Nijhof, and N.J. Doran, INSPEC Abstract Number: B9812–6260–236: "Soliton collisions with wavelength–division multiplexed systems with strong dispersion management", *Optics Letters*. vol. 23, No. 17 (sep. 1, 1998), pp. 1354–1356.

J.H.B. Nijhof, and N.J. Doran, Inside Conference Item ID: CN03634995: "Symmetry–Breaking and Bistability for Dispersion–Managed Solitions", Solid State Science and Technology Library (2000), vol. 6, pp. 299–308.

J.H.B. Nijhof, N.J. Doran, and W. Forysiak, INSPEC Abstract Number: A1999–14–4280S–014, B1999–07–6260F–011: "Dispersion–managed solitons in the normal dispersion regime: a physical interpretation", ECOC '98 (IEEE Cat. No. 98TH8398), vol. 1 (Sep. 20–24, 1998), pp. 103–104.

J.H.B., Nijhof, N.J. Doran, and W. Forysiak, INSPEC Abstract Number: B9805–6260–088: "Energy enhancement of dispersion–managed siltons and WDM", *Electronics Letters*, vol. 34, No. 5 (Mar. 1998), pp. 1726–1727.

Nijhof, N.J. Doran, W. Forysiak, and F.M. Knox, INSPEC Abstract Number: A9723–4281–012, B9712–6260–048: "Stable soliton–like propagation in dispersion managed systems with net anomalous, zero and normal dispersion", *Electronics Letters*, vol. 33, No. 20 (Sep. 25, 1997), pp. 1726–1727.

J.H.B. Nijhof, W. Forysiak, and N.J. Doran, INSPEC Abstract Number: A1999–03–4280S–009, B2000–08–4340S–007: "the averaging method for finding exactly periodic dispersion–managed solitons", *IEEE Journal of Selected Topics in Quantum Electronics*, vol. 21, No. 7 (Apr. 1, 1996), pp. 459–461.

C. Paré, A. Villeneuve, P.–A. Bélanger, and N.J. Doran, INSPEC Abstract Number: A9611–4265J–004, B9606–4340–090: "Compensating for dispersion and the nonlinear Kerr effect without phase conjugation", *Optics Letters*, vol. 21, No. 7 (Apr. 1, 1996), pp. 459–461.

C. Paré, A. Villeneuve, P.–A. Bélanger, N. Bélanger, INSPEC Abstract Number: A9709–4280S–018, B9705–6260–040, "Dispersion and self–phase modulation compensation based on a negative nonlinearity", *Technical Digest Series,* vol. 6 (1996), pp. IthA7–1/598–IthA7–4/601.

I.S. Penketh, P. Harper, S. B. Alleston, A.M. Niculae, I. Bennion, and N.J. Doran, INSPEC Abstract Number: A1999–17–4280S–034, B1999–09–6260–009: "10 Gbit/dispersion–managed soliton transmission over 16,500 km in standard fiber by reduction of soliton interactions", *Optics Letters,* vol. 24, No. 12 (Jun. 15, 1999), pp. 802–804.

L.J. Richardson, W. Forysiak, and N.J. Doran, Inside Conference Item ID: CN037962909: "320 Gbit/s Single Channel Transmission 4,500 Km Using Short Period Dispersion Management", 26th European Conference on Optical Communication (2000), vol. 3, pp. 187–188 VDE.

L.J. Richardson, W. Forysiak, and N.J. Doran, INSPEC Abstract Number: A1001–01–4265S–023, B2001–01–4340S–016: Energy enhancement of short–period dispersion–managed solitons, CLEO 2000, *TOPS,* vol. 39 (IEEE Cat. No. 00CH37088) (2000), pp. 32–33.

L.J. Richardson, W. Forysiak, and N.J. Doran, INSPEC Abstract Number: A2000–19–4265S–004, B2000–10–4340S–003: "Dispersion–managed soliton propagation in short–period dispersion maps", *Optics Letters,* vol. 25, No. 14 (Jul. 2000), pp. 1010–1012.

L.J. Richardson, W. Forysiak, and N.J. Doran, INSPEC Abstract Number: B2001–05–6260–001: "Trans–oceanic 160–Gb/s single–channel transmission using short–period dispersion management", *IEEE Photonics Technology Letters,* vol. 13, No. 3 (Mar. 2001), pp. 209–211.

L.J. Richardson, W. Forysiak, N.J. Doran, and K.J. Blow, INSPEC Abstract Number: B2001–07–6260–016: "Long–haul ultra high–speed transmission using dispersion managed solitons", *IEICE Trans. Electron.,* vol E84–C, No. 5 (May 2001), pp. 533–540.

L.J. Richardson, W. Forysiak, N.J. Doran, K.J. Blow, INSPEC Abstract Number: B2001–08–6260C–032: "Long–haul ultra high–speed transmission using dispersion managed solitons", IEICE Trans. Commun., vol. E84–B, No. 5 (May 2001), pp. 1159–1166.

N.J. Smith and N.J. Doran, INSPEC Abstract Number: A9612–4281–009, B9607–4125–008: "Modulational instabilities in fibers with periodic dispersion management", *Optics Letters,* vol. 21, No. 8 (Apr. 15, 1996), pp. 570–572.

N.J. Smith and N.J. Doran, INSPEC Abstract Number: B9510–6260–179: "Gordon–Haus jitter suppression using a single phase modulator in long span soliton systems", ECOC '95, 20th European Conference on Optical Communication, vol. 1 (1994), pp. 241–244.

N.J. Smith, N.J. Doran, and W. Forysiak, INSPEC Abstract Number: A9609–4280S–013, B9605–6260–075: "Gordon–Haus jitter suppression using an intra–span phase modulator and post transmission dispersion compensator", *IEEE Photonics Technology Letters,* vol. 8, No. 3 (Mar. 1996), pp. 455–457.

N.J. Smith, N.J. Doran, W. Forysiak, F.M. Knox, INSPEC Abstract Number: A9723–4281–005, B9712–4125–007: "Soliton transmission using periodic dispersion compensation", *Journal of Lightware Technology,* vol. 15, No. 10 (Oct. 1997), pp. 1808–1822.

N.J. Smith, N.J. Doran, F.M. Knox, and W. Forysiak, INSPEC Abstract Number: A9707–4265S–010, B9704–4340–042: "Energy–scaling characteristics of solitons in strongly dispersion–managed fibers", *Optics Letters,* vol. 21, No. 24 (Dec. 15, 1996), pp. 1981–1983.

N.J. Smith, W. Forysiak, and N.J. Doran, INSPEC Abstract Number: B9701–6260–010: "Reduced Gordon–Haus jitter due to enhanced power solitons in strongly dispersion managed systems", *Electronics Letters,* vol. 32, No. 22 (Oct. 24, 1996), pp. 2085–2086.

N.J. Smith, W. Forysiak, and N.J. Doran, INSPEC Abstract Number: B9808–6260–182: "Gordon–Haus jitter reduction in enhanced power soliton systems", *OFC '97 Technical Digest,* vol. 6 (1997) (IEEE Cat. No. 97CH36049), p. 309.

N.J. Smith, F.M. Knox, N.J. Doran, K.J. Blow, and I. Bennion, INSPEC Abstract Number: B9603–6260–093: "Enhanced power solitons in optical fibres with periodic dispersion management", *Electronics Letters,* vol. 32, No. 1 (Jan. 4, 1996), pp. 54–55.

N.J. Smith, F.M. Knox, N.J. Doran, K.J. Blow, and I. Bennion, INSPEC Abstract Number: A9612–424265S–014, B9607–4340–037: "Dispersion management of optical fibre solitons", IEE Colloquium on Optical Solitons: Principles and Applications (Digest No. 1996/090) (1996), p. 6/1–5.

M. Suzuki, et al., "Multi–Ten Gbit/s Soliton Transmission Over Transoceanic Distances", Physics and Applications of Optical Solitons in Fibres '95: Proceedings of the Symposium held in Kyoto, Japan (Nov. 14–17, 1995).

M. Suzuki, I. Morita, N. Edagawa, S. Yamamoto, H. Taga, and S. Akiba, "Reduction of Gordon–Haus timing jitter periodic dispersion compensation in soliton transmission", *Electronics Letters,* vol. 31, No. 23 (Nov. 9, 1995), pp. 2027–2029.

M. Suzuki, I. Morita, S. Yamamoto, N. Edagawa, H. Taga, and S. Akiba: "Timing jitter reduction by periodic dispersion compensation in soliton transmission", *Optical Fibre Communications (OFC'95),* Opt. Soc. Am., Washington, D.C. (1995), Paper PD20–1/401–PD20–4/404.

S.K. Turitsyn, N.J. Doran, J.H.B. Nijhof, V.K. Mezentsev, T. Schäfer, and W. Forysiak, Inside Conference Item ID: CN037481040: "Dispersion–Managed Solitons", Centre de Physique—Publications (1999), Springer, No. 12, pp. 91–115.

S.K. Turitsyn, N.J. Doran, E.G. Turitsyna, E.G. Shapiro, and M.P. Fedoruk, INSPEC Abstract Number: A2001–01–4265S–022, B2001–01–4340S–015: "Soliton interaction in optical communication systems with short–scale dispersion dispersion management", CLEO 2000, *TOPS,* vol. 39 (IEEE Cat. No. 00CH37088) (2000), pp. 30–31.

S.K. Turitsyn, N.J. Doran, E.G. Turitsyna, E.G. Shapiro, M.P. Fedoruk, and S.B. Medvedev, Inside Conference Item ID: CN036434946: "Optical communication Systems with Schort–Scale Dispersion Management", Solid State Science and Technology Library (2000), vol. 6, pp. 235–251.

S.K. Turitsyn, M.P. Fedoruk, N.J. Doran, and W. Forysiak, INSPEC Abstract Number: B2000–08—6260F–006: "Optical Soliton transmission in fiber lines with short–scale dispersion management", ECOC '99 Conference, vol. 1 (Sep. 26–30, 1999), pp. 382–383.

S.K. Turitsyn, M.P. Fedoruk, W. Forysiak, and N.J. Doran, INSPEC Abstract Number: A2000–02–4280S–029, B2000–01–6260C–071: "Dispersion–management in fiber communication lines using Raman amplification", *Optics Communications*, vol. 170, (Oct. 15, 1999), pp. 23–27.

S.K. Turitsyn, J.H.B. Nijhof, V.K. Mezentsev, and N.J. Doran, INSPEC Abstract Number: A2000–04–4281–014, B2000–02–4125–089: "Symmetries, chirp–free points, and bistability in dispersion–managed fiber lines", *Optics Letters*, vol. 24, No. 24 (Dec. 15, 1999), pp. 1871–1873.

Zhang et al., *Optical Solition Propagation in a Positively and Negatively Dispersion Allocated Fiber*, Communication Technology Proceedings, ICCT1, 1996, pp. 319–322.

Suzuki et al., *Reduction of Gordon–Haus Timing Jitter by Dispersion Compensation in Soliton Transmission*, Electronic Letters 31, 1995, pp. 1–7 and Figures 1–3.

Kawai et al., *10 Gbit/s Optical Solition Transmission Over 7200 km by Using a Monolithically Integrated MQW–DFB–LD/MQW–EA Modulator Light Source*, Electronics Letters, vol. 30, No. 3, Feb. 3, 1994, pp. 251–252.

Chen et al., *Solition Fiber Ring Laser*, Optics Letters, vol. 17, No. 6, Mar. 15, 1992, pp. 417–419.

Nakazawa et al., *Nonlinear Pulse Transmission Through an Optical Fiber at Zero–Average Group Velocity Dispersion*, IEEE Photonics Technology Letters, vol. 8, No. 3, Mar. 1996, pp. 452–454.

Smith et al., *Reduced Gordon–Haus Jitter Due to Enhanced Power Solitons in Strongly Disperson Managed Systems*, Electronics Letters, vol. 32, No. 22, Oct. 24, 12994, pp. 2085–2086.

Smith et al., *Enhanced Power Solitons in Optical Fibers with Periodic Dispersion Management*, Electronics Letters, vol. 32, No. 1, Jan. 4, 1996, pp. 54–55.

Golovchenko et al., *Collision–induced Timing Jitter Reduction by Periodic Dispersoin Management in Soliton WDM Transmission*, Electronics Letters, vol. 33, No. 9, Apr. 24, 1997, pp. 735–736.

Smith et al., *Energy–scaling Characteristics of Solitons in Strongly Dispersion Managed Fibers*, Optics Letters, vol. 21, No. 24, Dec. 15, 1996, pp. 1981–1983.

* cited by examiner

OPTICAL COMMUNICATIONS

This is a continuation of application Ser. No. 09/083,966, filed May 26, 1998, now abandoned; the entire content of which is hereby incorporated by reference in this application which is a continuation of PCT/GB96/02923 filed in Nov. 27, 1996.

This invention relates to optical communications and, in particular, to optical communications systems in which information is transmitted by soliton or soliton-like pulses.

BACKGROUND OF THE INVENTION

Laboratory demonstrations have recently been reported of soliton transmission in systems where the dispersion was not uniformly anomalous along the fibre, instead being periodically compensated by fibre of opposite (normal) sign dispersion. In this manner transmission was achieved at 20 Gb/s over 9000 km in a recirculating loop, and 8100 km in a straight line experiment. These figures are substantially in excess of what has previously been achieved without the use of soliton control techniques such as sliding filters and synchronous modulators. While it is thus clear that there are significant benefits to be gained from adopting dispersion management in soliton systems, to date there has been little conceptual explanation of the mechanisms behind this improvement.

The correct selection of dispersion is a critical issue in the design of amplified long haul optical communication systems. In the case of soliton formatted data, it is dictated by compromise between the desire to minimise timing jitter problems (implying low dispersion), and the need to maintain adequate energy per bit for successful detection. As the energy needed to form a soliton in a uniform fibre is proportional to the dispersion, the latter constraint places a lower limit on the permitted dispersion. Dispersion management is a technique in the context of non-return-to-zero (NRZ) formatted data in which fibres of opposite sign dispersions are concatenated together. This produces a high local dispersion at any given point, and yet a low path-average dispersion. We have found that, by adopting a suitable dispersion management scheme for soliton or soliton-like transmission, it is possible to increase the soliton energy substantially compared with the equivalent uniform fibre with equal path-average dispersion.

DESCRIPTION OF THE INVENTION

According to the present invention there is provided a dispersion management system for soliton or soliton-like transmission in which the duration of a dispersion compensation phase is short in comparison with the propagation interval in the remainder of the system.

Preferably the system excludes arrangements in which the dispersion map of one fibre is substantially closer to zero than that of its complementary fibre.

BRIEF DESCRIPTION OF THE DRAWINGS

The invention will be particularly described with reference to the accompanying drawings in which.

DETAILED DESCRIPTION OF THE INVENTION

Figure 1:
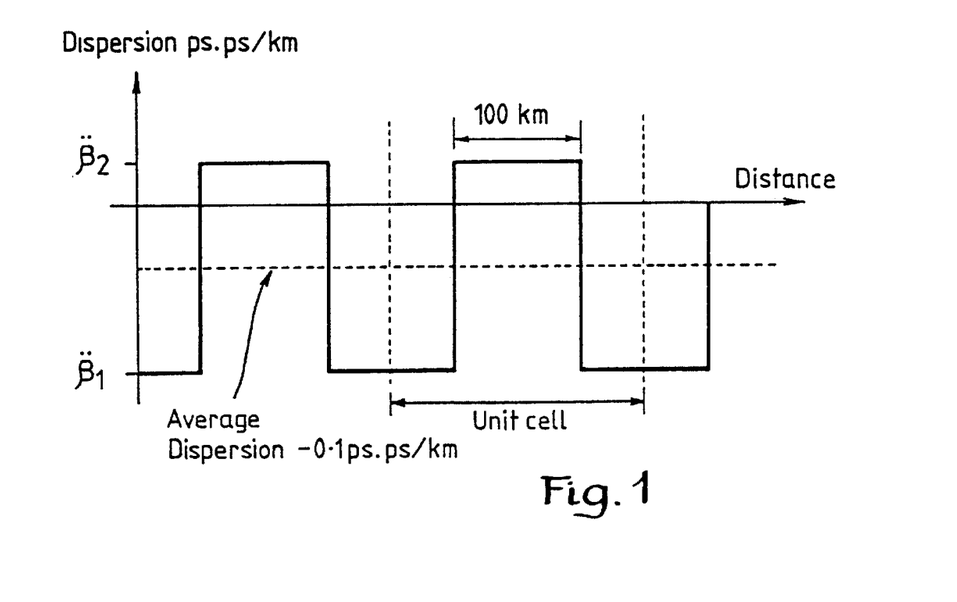
FIG. 1 is a dispersion compensation map.
Figure 5:
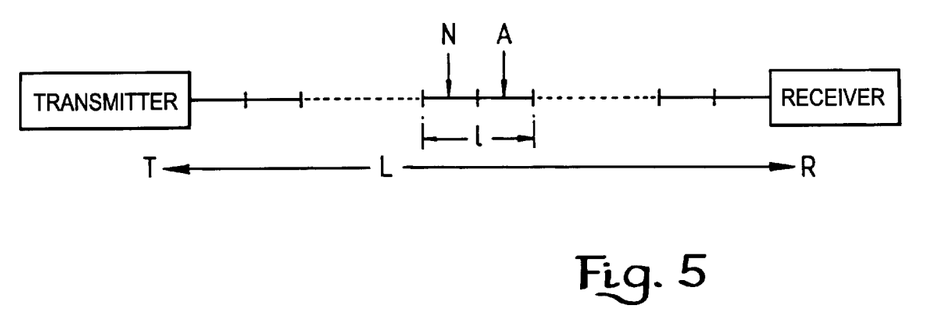
FIG. 5 is an outline diagram of a dispersion management system in accordance with one aspect of the invention.

Our work is based upon numerical integration of the Nonlinear Schrödinger Equation (NLS), using the dispersion map shown in FIG. 1. The arrangement of a typical system is shown in FIG. 5 and comprises a transmitter T and Receiver R lined by a length L of fibre. This fibre is divided into elements 1 comprising separate sections of fibre N with normal dispersion and fibre A with anomalous dispersion. In a specific embodiment these are of equal length, although the unit cell is defined to start and end at the mid point of one of the fibres. In the specific examples presented, each of the fibres will be 100 km long, and the path average dispersion $-0.1$ $ps^2/km$. The nonlinear coefficient was taken to be 2.65 rad/W/km. To simplify the problem we have chosen to neglect loss and high order dispersion throughout.

Figure 2:
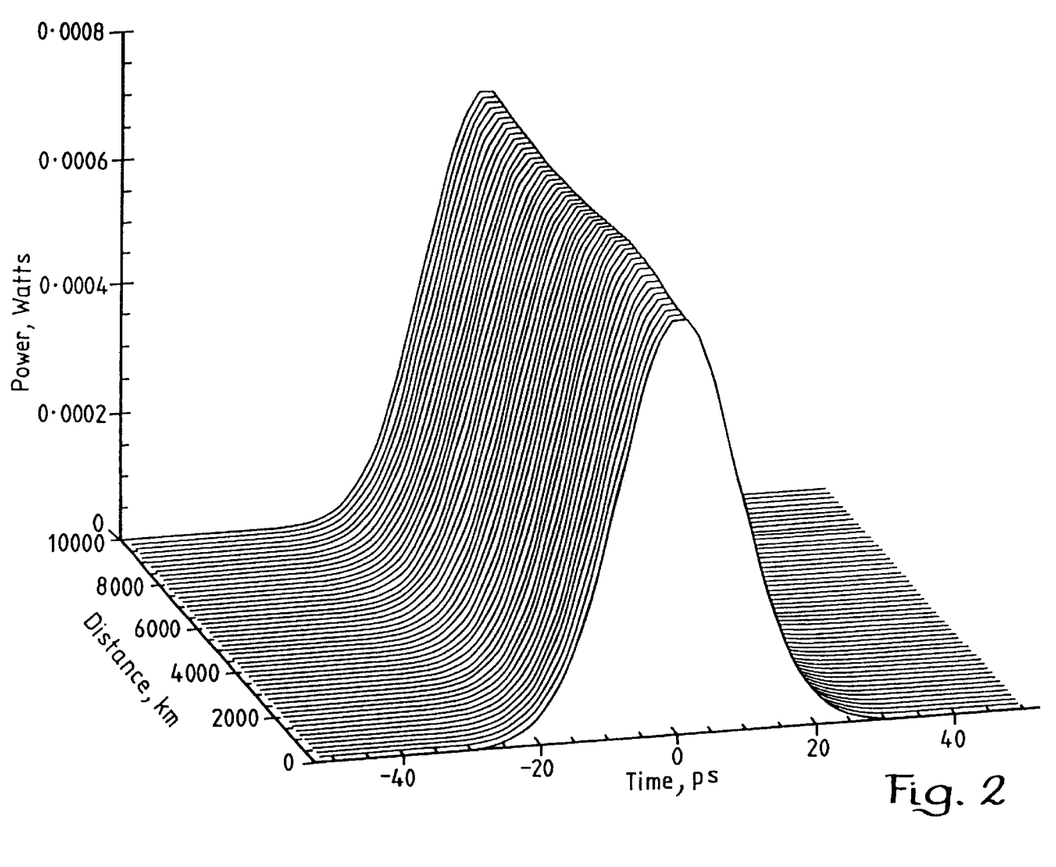
FIG. 2 shows the pulse profile at the beginning of each unit cell in a dispersion managed system. The dispersion map comprises alternating 100 km fibres with dispersions of $-3$ $ps^2/km$ and $+2.8$ $ps^2/km$.
Figure 3:
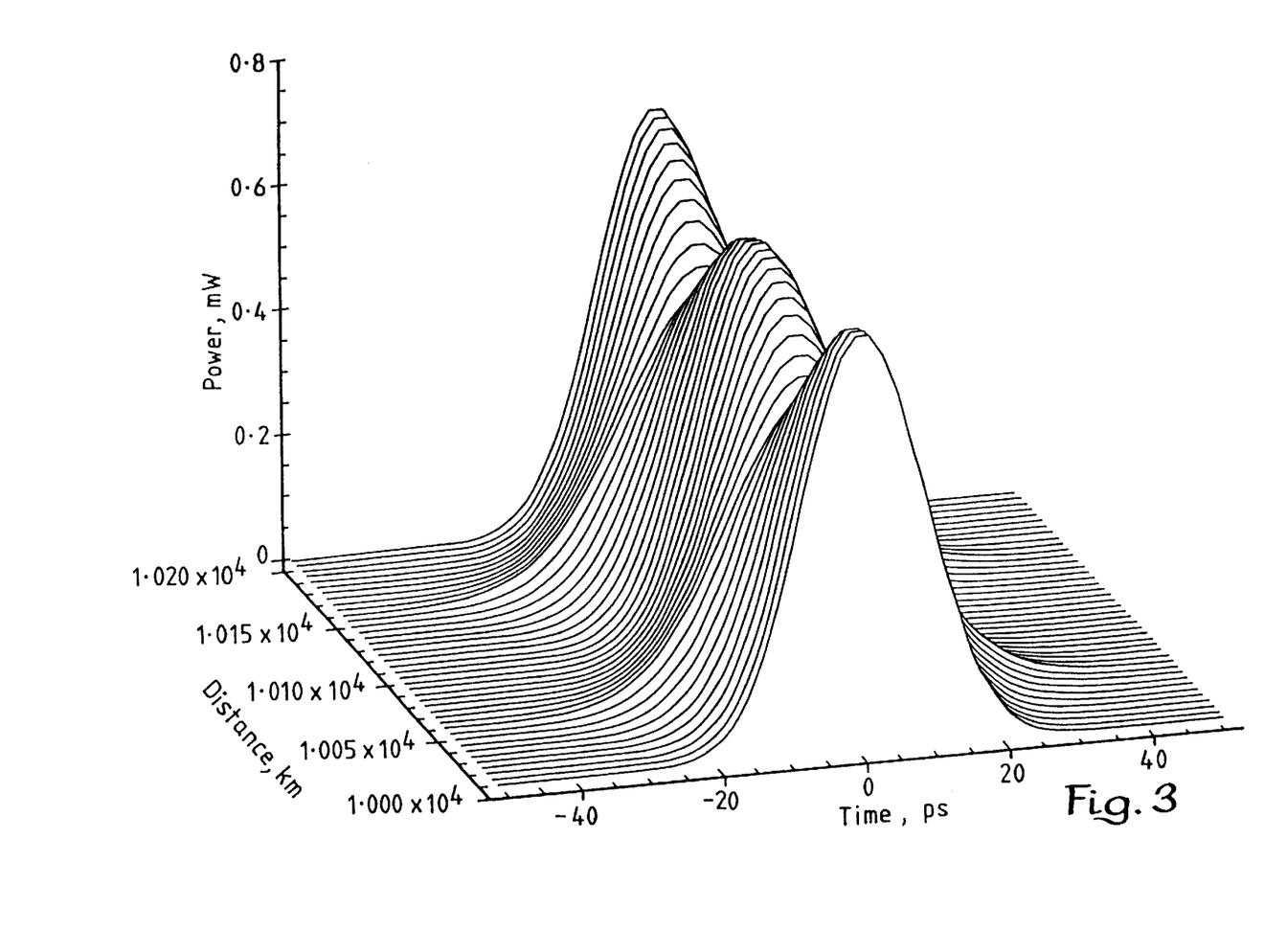
FIG. 3 shows the evolution of a over one period of the dispersion compensation cycle.

We have confirmed the existence of quasi-stable soliton or solitary wave solutions to this dispersion map. FIGS. 2 and 3 show the observed behaviour when the dispersion values alternated between $-3.0$ $ps^2/km$ and $+2.8$ $pS^2/km$, and a 20 ps FWHM Gaussian pulse of peak power 650 $\mu W$ was launched into the fibre. FIG. 2 shows the intensity profiles at the start of each unit cell; it can be seen that the pulse profile at these points remains unchanged over successive cycles of the dispersion map. The evolution within one unit cell is shown in FIG. 3, the pulse alternately compressing and dispersing as the sign of the dispersion is switched. The power spectrum remains essentially unchanged within the unit cell.

There are three constraints which must be satisfied to obtain stable solutions to the periodic dispersion map. Firstly, the path average dispersion must be anomalous, in order that the Kerr induced spectral broadening can be compensated. Secondly, the period of the dispersion compensation cycle must be short compared to the nonlinear length of the system. For a 1000 Km fibre, the dispersion compensation length is preferably 100 Km or less. Finally, dispersion maps in which one of the fibres is much closer to zero dispersion than the other should be avoided. as otherwise energy is rapidly coupled out of the pulse into dispersive waves.

Figure 4:
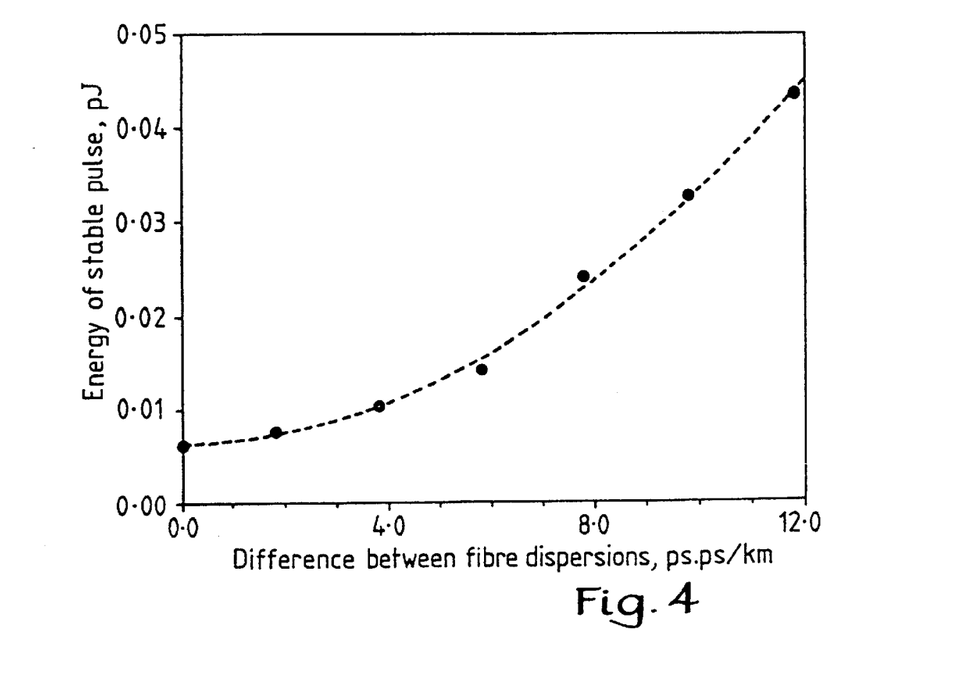
FIG. 4 shows the energy required to launch a 20 ps FWHM soliton in dispersion managed system with alternating 100 km length fibres chosen such that the path-average dispersion remains at $-0.1$ $ps^2/km$.

The advantages conferred by a dispersion management scheme on soliton communications stems from the fact that more energy is required to launch a stable pulse than in the equivalent uniform system with equal path average dispersion. This is demonstrated in FIG. 4, which plots the pulse energy of the stable solution as a function of the difference between the dispersion values of the two individual fibres. Preferably, the difference between fibre dispersions is less than 12.0 $ps^2/Km$ and, ideally, less than 4.0 $ps^2/Km$. Under optimum conditions it will be 0.1 $ps^2/Km$ or less. Greater differences between the two fibres results in more energy being required to form a stable pulse; we have also found that lengthening the unit cell's period (with a given pair of dispersion values) increases the required energy. The mechanism behind this increased energy requirement can be understood from the intensity profile within the unit cell, FIG. 3. Due to the cycle of dispersive broadening and compression, the peak power of the pulse is generally lower than the initial launch power. Therefore the rate of self phase modulation (SPM) is reduced compared to the equivalent uniform fibre, and so more energy is required to balance the path-average dispersion. In the frequency domain, the process could be construed as a reduction in the efficiency of four wave mixing of which SPM is a special case.

Another highly novel feature of these solitary waves is that their pulse shapes are not the hyperbolic secants of regular optical fibre solitons. The example pulse profile which we have displayed is almost exactly Gaussian in nature, however this is only a special case for that particular dispersion map. As the dispersion variation is increased there is a transition from the uniform fibre hyperbolic secant soliton (time-bandwidth-product 0.32) to Gaussian (0.44) form, and then to pulse shapes with higher still time-bandwidth-products. An interesting connection can be made at this point with the "stretched pulse" design of mode-locked fibre laser. These incorporate cavities with two opposite signs of dispersion and also produce Gaussian shaped pulses.

In cases of soliton or soliton-like transmission in dispersion compensated fibres employing a configuration with zero path average dispersion, undistorted pulse propagation was obtained in this situation due to the presence of optical filters in the recirculating loop. The stable pulses then arose from balancing SPM against filtering, rather than SPM against the path-average dispersion.

The technique of dispersion management has the potential to make a significant impact of the realisation of soliton communication systems. It provides major performance benefits, and has the distinct advantage of requiring only passive components. While, in a preferred embodiment, we have used equal lengths of two different fibres, alternative embodiments may use discrete dispersion compensators fabricated from highly dispersive materials. The adoption of dispersion management represents a convergence between the techniques used in soliton and NRZ formatted transmission.

What is claimed is:

1. An optical communication system for transmitting soliton or soliton-like pulses, comprising:
    a transmitter;
    a receiver; and
    a dispersion management system between the transmitter and the receiver, the dispersion management system comprising a multiplicity of fiber sections of opposite sign dispersions concatenated together such that the duration of a dispersion compensation phase is short in comparison with the propagation interval in the remainder of the system and such that the path average dispersion is anomalous;
    and the dispersion management system being such that soliton or soliton-like pulses alternately compress and disperse as they propagate through the fiber sections along the optical path.

2. An optical communication system according to claim 1 wherein the optical path comprises a multiplicity of unit cells, each unit cell comprising a first fiber section of one sign dispersion followed by a second fiber section of opposite sign dispersion, arranged such that the pulse is launched into the multiplicity of unit cells with a predetermined shape, which shape is repeated during propagation, at a point in each unit cell.

3. An optical communication system according to claim 2, wherein the pulse profile of a soliton at the beginning of a unit cell is Gaussian in shape.

4. An optical communication system according to claim 2, wherein the unit cell is defined to start along the length of a fiber section between its ends, and to end along the length of a fiber section, between its ends.

5. An optical communication system according to claim 2, arranged such that a pulse is launched into the multiplicity of unit cells with a Gaussian shape.

6. An optical communication system according to claim 1, wherein a fiber section comprises discrete compensator means.

7. An optical communication system for transmitting solitons, comprising a multiplicity of fiber sections of opposite sign dispersion concatenated together for management of dispersion,
    the fiber sections being formed as a multiplicity of unit cells, each unit cell including first and second adjacent fiber sections of opposite sign dispersion, wherein each unit cell is short in relation to the length of the system; and
    wherein the dispersion magnitude of adjacent fiber lengths of a unit cell are both far from zero in relation to the average dispersion of the unit cell which is close to zero, in order to permit the propagation of pulses through the unit cells which alternately compress and expand in shape as they propagate through the unit cell.

8. An optical communication system according to claim 7 arranged such that the pulse is launched into the multiplicity of unit cells with a predetermined shape, which shape is repeated during propagation, at a point in each unit cell.

9. An optical communication system according to claim 7, wherein the pulse profile of a soliton at the beginning of a unit cell is Gaussian in shape.

10. An optical communication system according to claim 7, wherein the unit cell is defined to start along the length of a fiber section between its ends, and to end along the length of a fiber section, between its ends.

11. An optical communication system according to claim 7, arranged such that a pulse is launched into the multiplicity of unit cells with a Gaussian shape.

12. An optical communication system according to claim 7, wherein the optical path average dispersion is anomalous.

13. An optical communication system according to claim 7, wherein a fiber section comprises discrete compensator means.

14. A method of transmitting soliton pulses in an optical communication system, the system comprising a multiplicity of fiber sections of opposite sign dispersion concatenated together in order to provide a relatively high local dispersion at any given point, but a relatively low path-average dispersion,
    the fiber sections being formed as a multiplicity of unit cells, each unit cell comprising first and second adjacent fiber sections of opposite sign dispersion,
    the method comprising launching a soliton pulse into the dispersion management system with a predetermined energy, the predetermined energy being greater than that for launching a pulse in an equivalent uniform system with equal path average dispersion, and
    transmitting the pulse through the dispersion management system with the pulse profile having the same at the start of each unit cell, whilst alternately compressing and expanding as the pulse progresses through a unit cell.

15. A method according to claim 14, including launching the pulse into the system with a Gaussian shape.

16. A method according to claim 14, including launching a pulse into the system with a predetermined form, and the pulse profile is repeated at a point within each unit cell.

17. A method of transmitting soliton or soliton-like pulses in an optical communication system, the method comprising:

providing a dispersion management system comprising fiber sections of opposite sign dispersions concatenated together such that the duration of a dispersion compensation phase is short in comparison with the propagation interval in the remainder of the system and that the path average dispersion is anomalous;

launching a stable soliton or soliton-like pulse having a predetermined energy into the dispersion management system with a predetermined form, which is repeated at intervals during propagation point while this pulse shape alternately expands and progresses as it propagates through the system.

* * * * *